3,552,859
OPTICAL INSTRUMENT FOR DETERMINING THE PARALLELISM OR NONPARALLELISM OF TWO REFLECTING SURFACES
John L. Snyder III, Garland, Tex., assignor to Texas Instruments Incorporated, Dallas, Tex., a corporation of Delaware
Filed Mar. 4, 1964, Ser. No. 349,454
Int. Cl. G01n 21/44; G01b 10/27
U.S. Cl. 356—114       15 Claims

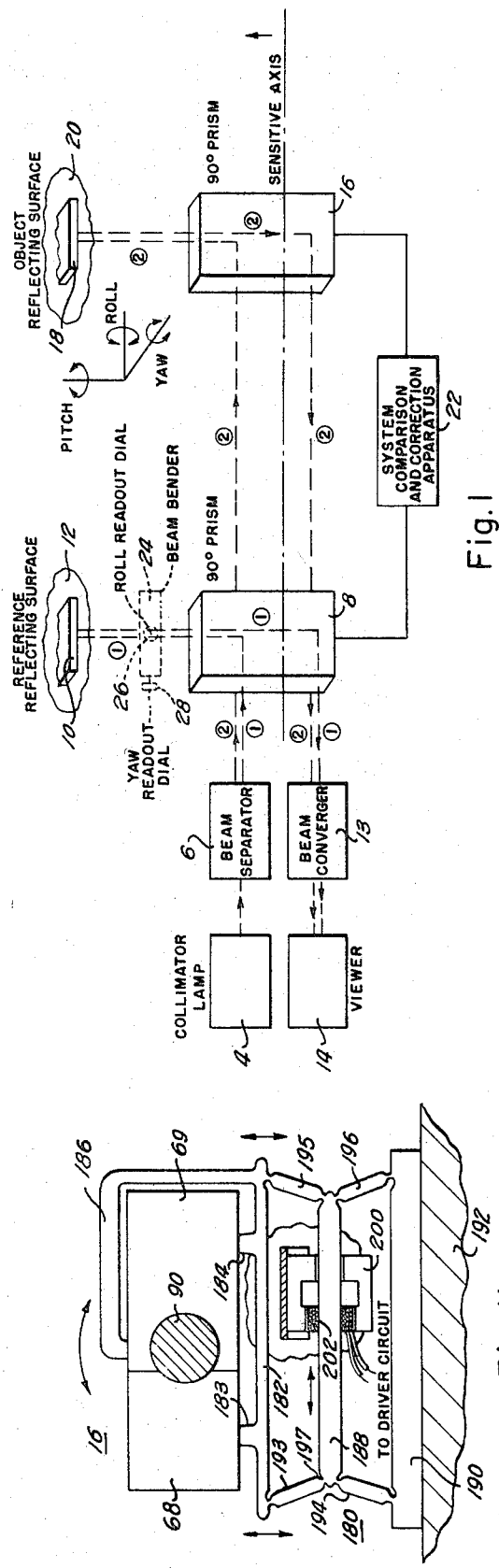
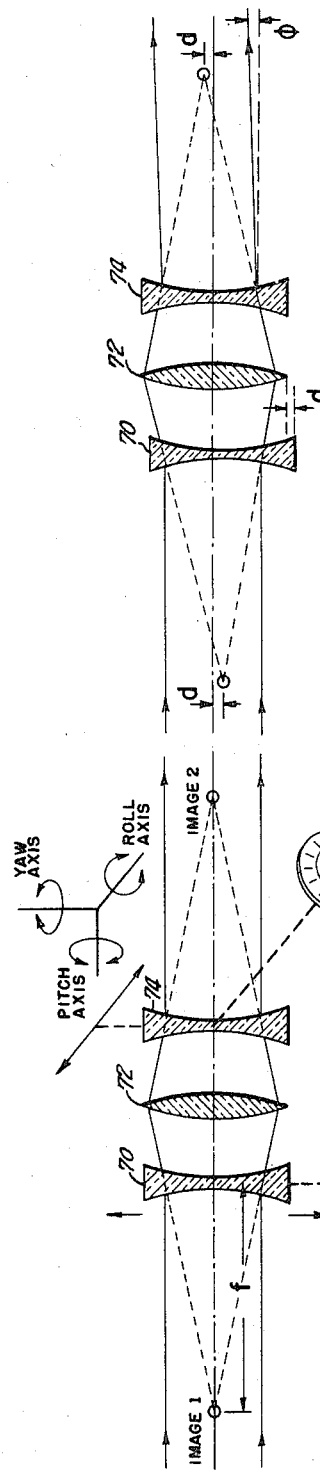
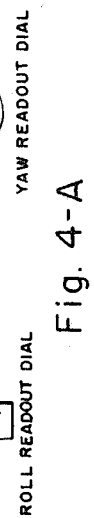
INVENTOR
John L. Snyder, III
BY Thomas A. Harwood
ATTORNEY

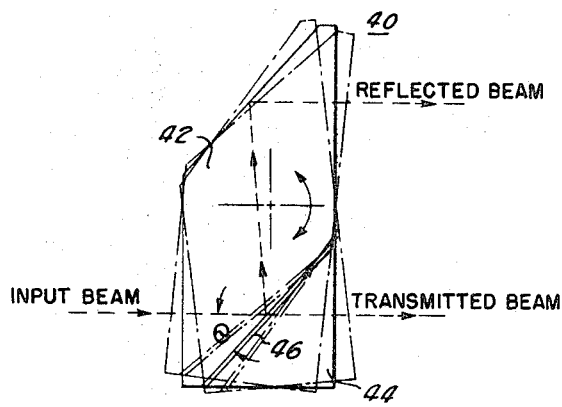
Fig. 3-A
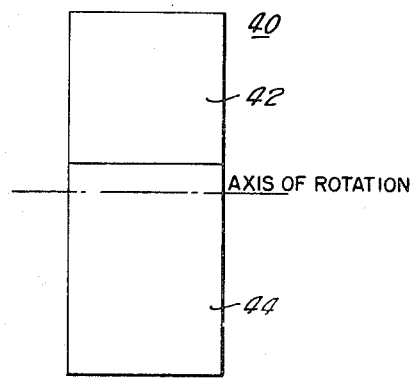
Fig. 3-B
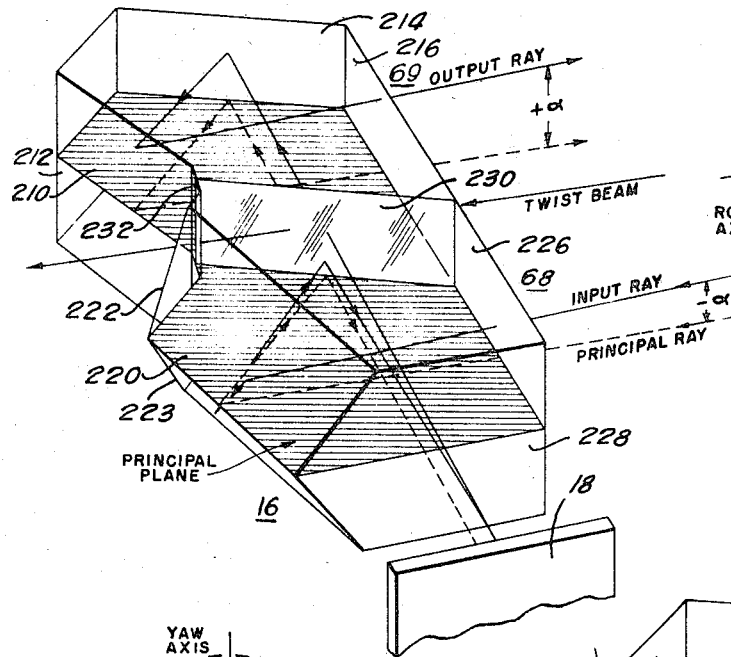
Fig. 14
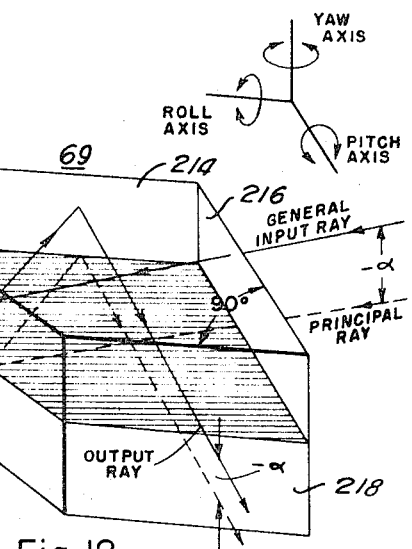
Fig. 12
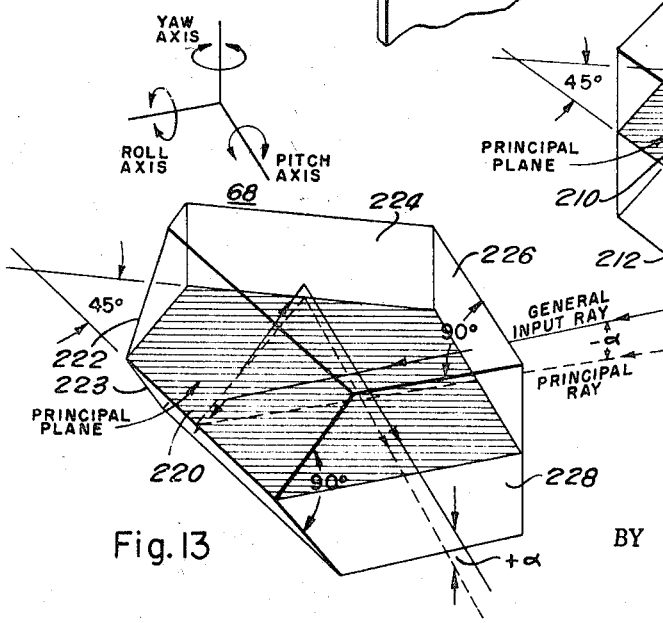
Fig. 13
INVENTOR
John L. Snyder, III

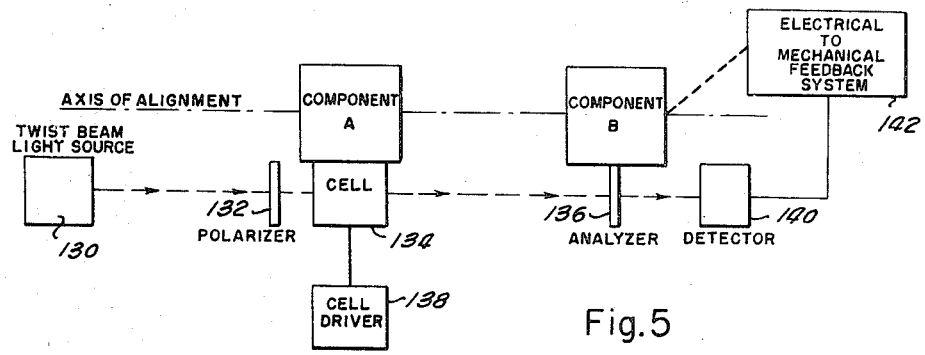
Fig. 5
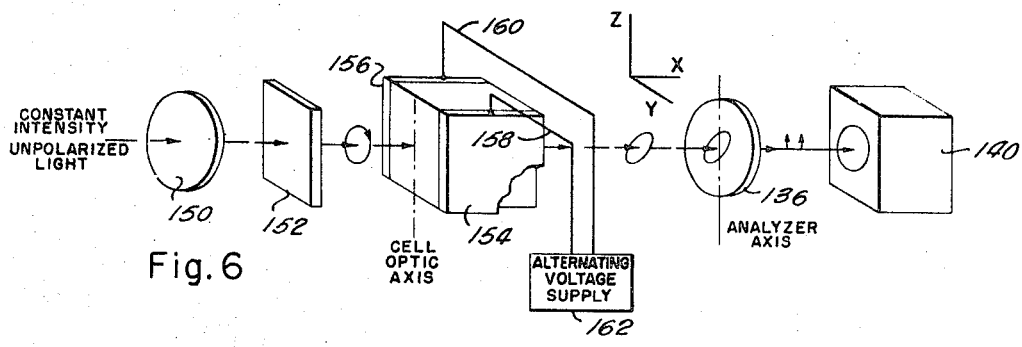
Fig. 6
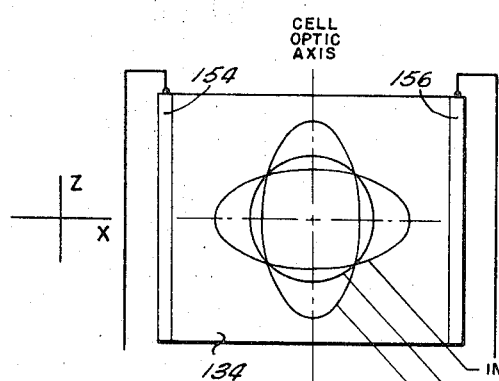
Fig. 7
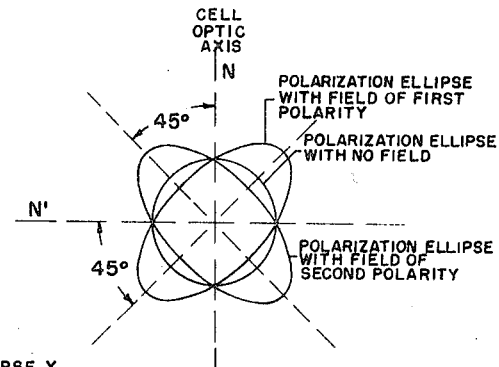
Fig. 8
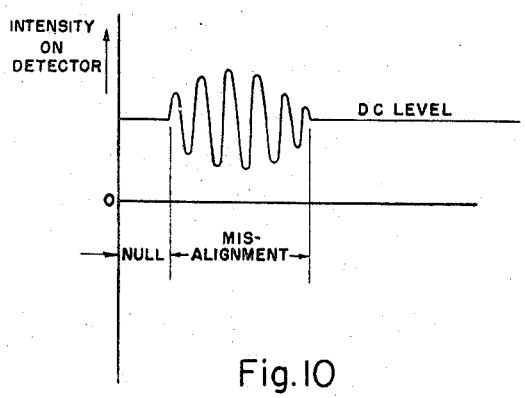
Fig. 10
Fig. 9
INVENTOR
John L. Snyder, III
BY Thomas A. Harwood
ATTORNEY United States Patent Office 3,552,859
Patented Jan. 5, 1971

ABSTRACT OF THE DISCLOSURE

An optical apparatus is disclosed for use in measuring the parallelism or degree of nonparallelism of two reflecting surfaces which are separated laterally along a line parallel to said surfaces—has been inserted before the period. The apparatus measures the exact degree of nonparallelism and is insensitive to small movements about any axis of rotation.

---

This invention relates generally to optical apparatus and more specifically to optical apparatus for determining the parallelism or nonparallelism of two reflecting surfaces. It further relates to such apparatus which can be used to measure, in quantitative units, the degree of misalignment of one of the two reflecting surfaces relative to the other reflecting surface.

Mirrors or other reflecting surfaces are commonly used to acurately define the orientation of some piece of equipment relative to some standard coordinate system. For example, orthogonal mirrors are used to accurately define a ship's coordinates by accurately installing the mirrors on a stable surface within the ship. These mirrors are then used to align all other equipment on the ship to the same coordinate reference. The ship's inertial navigation unit has reference mirrors on its own stable platform, and is nulled or aligned by alligning the reference mirrors on its platform to the ship's coordinate reference mirrors. Similarly, the smaller inertial navigation units contained within missiles which are carried abroad a sea-going vessel are equipped with reference mirrors and are aligned to ship's coordinates by a similar procedure. Although these are only specific applications, any piece of equipment having a reflecting surface can be aligned with some standard reference coordinates by measuring the parallelism or nonparallelism between the reflecting surface and a standard reflecting surface.

Apparatus used to measure the parallelism between two reflecting surfaces can introduce error in the measurement if the apparatus must be accurately oriented itself, which it must be. Fore example, the components comprising the measurement apparatus are subject to vibration, shock, metal creep, temperature expansions and contractions, and other effects. Thus any measurement made on the parallelism of two reflecting surfaces will be impaired by the error introduced by the inaccuracy of the measuring system itself. If the two reflecting surfaces are far apart, additional mechanical apparatus is required to effect the measurement and it becomes readily apparent that an even greater error is introduced. Since parallelism measurements are made exclusively with optical apparatus, most of this error is caused by the mechanical and structural instability of support brackets and mountings for the optical components. Moreover, conventional instruments, such as autocollimators, that do provide good accuracy in measurements are restricted to measuring two reflecting surfaces with one behind the other and separated along a line perpendicular to the reflecting surfaces.

The system of the present invention does not rely on the mechanical stability of support brackets and mountings for the optical components and, consequently, retains a high degree of measurement accuracy notwithstanding physical surrounding conditions. An optical system is used whose components are insensitive to some motion which would introduce measurement errors and are automatically and constantly corrected for other motions which tend to introduce error. Further, the apparatus to be described is primarily useful for measuring the parallelism between two reflecting surfaces which are separated laterally along a line parallel to the surfaces, in contradistinction to an autocollimator, for example. Because of the insensitivity of the system of the invention to its physical surroundings, the distance of separation between the two reflecting surfaces to be measured is immaterial.

More specifically, the invention utilizes a collimator lamp for emitting a well defined beam of light which is split into two separate beams by a beam splitter. One of the beams is directed to impinge on one of the reflecting surfaces to be measured, and the other beam is directed to impinge on the other reflecting surface. After the two beams are reflected from the two surfaces, they are returned into a viewer wherein the operator can compare the two reflected beams for coincidence of images. The two beams derived from the collimator lamp are directed onto the two reflecting surfaces, respectively, by two optical devices, such as prisms, for example, which directed the two beams onto the two reflecting surfaces in parallel fashion, and each of which is characterized in that movement of the optical device about two of its axes has insignificant effects, if any, on the direction of the light beam traversing the device. The two optical devices, however, are sensitive to motion about their respective third axes and the invention includes an automatic comparison and correction means for maintaining the two devices aligned with respect to their respective sensitive axes. Since a comparison technique between the two reflected beams is used, no measurable errors will be introduced by the apparatus even though the optical devices are rotated about their sensitive axes, the devices being always maintained in alignment with each other about their sensitive axes. The latter implies that the two sensitive axes are themselves in alignment; therefore any error in motion of one optical device about its sensitive axis is exactly cancelled by the error introduced in the motion of the other optical device about its sensitive axis which is aligned with the former. Because of the nondependence of the accuracy of the system of the invention on surrounding physical conditions, measurement of the parallelism between two reflecting surfaces at any distance of separation is possible, and it can be seen that the system of the invention has application to the measurement of the parallelism or the comparison thereof between two reflecting surfaces situated on virtually any type of equipment in any locale. Other objects, features and advantages will become apparent from the following detailed description when read in conjunction with the appended claims and the attached drawings wherein like reference numerals refer to like parts throughout the several figures and in which:

FIG. 1 is a block diagram illustrating schematically the various components of the apparatus of the invention and their functions;

Figure 2:
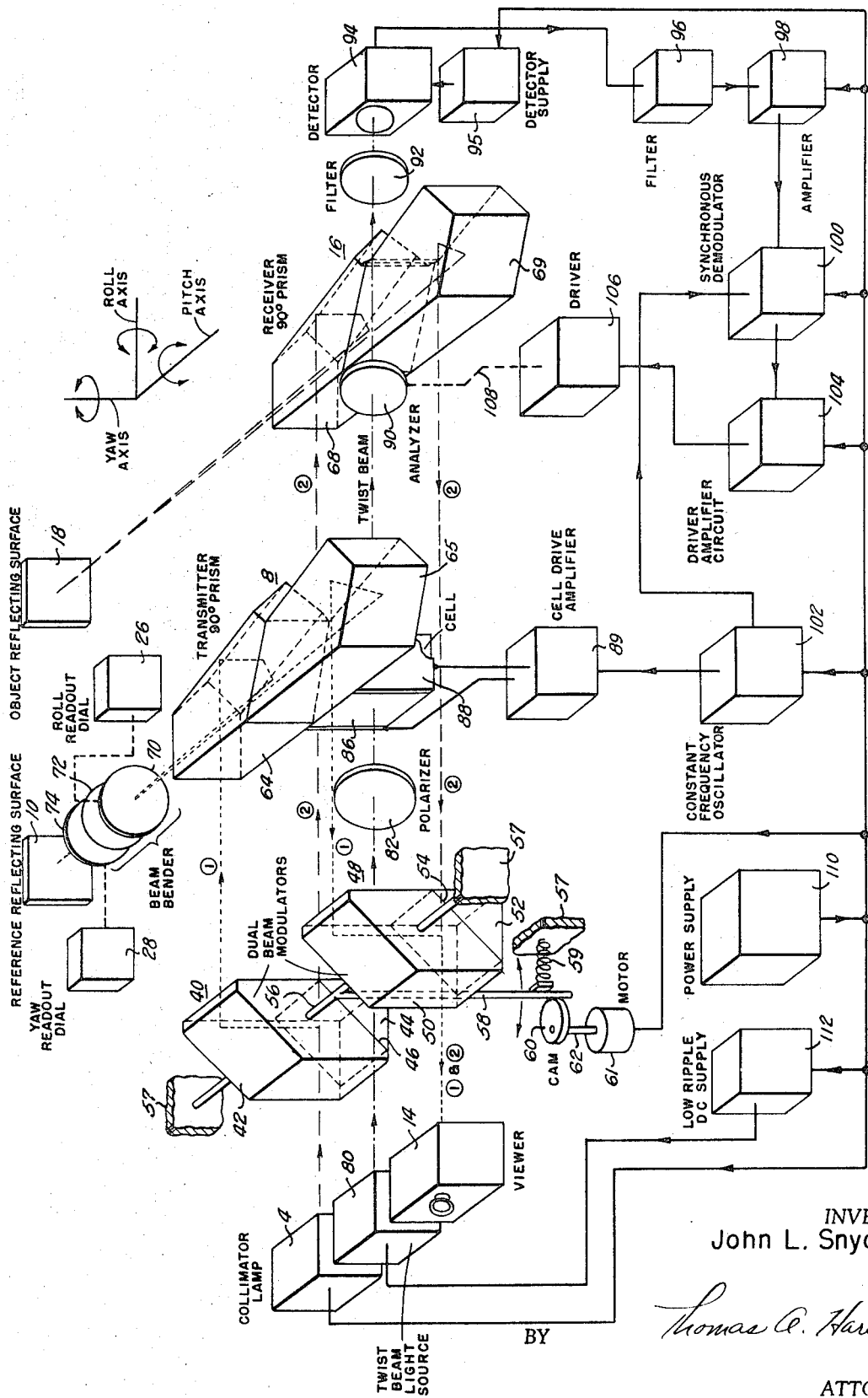
FIG. 2 is a block diagram which illustrates, schematically, a preferred embodiment of the invention.

FIGS. 3–A and 3–B are side and front views, respectively, of a prism used as a beam separator;

FIGS. 4–A and 4–B are schematic views showing a beambender and its operation;

FIG. 5 is a block diagram of an electro-optical comparison and correction system such as is used to maintain alignment between two components of the apparatus about a particular axis;

FIG. 6 is a pictorial illustration of a preferred embodiment of a portion of the system shown in FIG. 5;

FIG. 7 is a schematic illustration of an optical cell used by the apparatus of FIG. 6;

FIG. 8 is a schematic illustration of the polarization characteristics of the light emerging from the cell of FIG. 7;

FIG. 9 is a graphical representation of the electrical output of the apparatus of FIG. 5 as a function of the relative rotation of two of the components of the apparatus;

FIG. 10 is a graphical representation of the electrical output of the apparatus of FIG. 6 as a function of an electrical signal applied to the optical cell;

FIG. 11 is a side elevational view of a driver means used to rotate one of the 90° prisms about its sensitive axis;

FIG. 12 is a pictorial representation of a plain pentaprism and a ray of light traversing the prism;

FIG. 13 is a pictorial representation of a roof pentaprism and a ray of light traversing the prism; and FIG. 14 is a pictorial representation of one of the 90° prisms used in the system of the invention which utilizes a combination of a plan pentaprism and a roof pentaprism.

Referring now to FIG. 1, which is a schematic block diagram of the invention, a suitable collimator lamp 4 is used to direct a beam of light on a beam separator 6, the latter splitting the collimator into light beams 1 and 2. Light beam 1 is directed on a first 90° optical device 8, such as a prism which, in turn directs this beam along a first path on a first surface which will be referred to as the reference reflecting surface 10. This reflecting surface, such as a mirror, is normally mounted on some stable surface 12. The light beam 1 is reflected by the reference reflecting surface back into the 90° prism 8 which again diverts the light beam by 90° back in the direction of the collimator lamp onto a beam combiner 13. The beam 1 is actually directed into a viewer 14 by the combiner for observation by an operator. The other beam 2 created by the beam separator is directed past the first 90° prism and onto the face of a second optical device 16, such as another 90° prism. The prism 16 diverts the beam 2 by 90° along a second path parallel to said first path onto a second or object reflecting surface 18 which, in turn, is mounted on some piece of equipment 20. The beam 2 is reflected by surface 18 back into the prism 16 which, in turn, diverts the beam again by 90° onto the beam combiner 13, which also directs this beam into the viewer 14. Actually, the beam combiner directs both beams 1 and 2 into the viewer along the same path, although not necessarily simultaneously, as will be seen hereinafter. In the event that the two reflecting surfaces 10 and 18 are exactly parallel, the images caused by the reflection of the two beams by the two reflecting surfaces will coincide in the viewer. Any suitable viewer means can be used to observe or compare the two images. For example, a scintillating effect can be created by causing the beam separator to create beams 1 and 2 at different times in sequence to produce two images within the viewer that do not coincide time-wise, which the observer sees as a scintillating effect if the images do not exactly coincide in location. The eye is very sensitive to a scintillating effect and if the two images produced by the reflection of beams 1 and 2 are in exact coincidence, the eye will detect no scintillating effect within the viewer. Moreover, FIG. 1 is merely a schematic drawing, wherein the first optical device 8 and the beam separator 6 can be combined, if desired, and where different light paths can be used.

It is apparent that even if the mirrors or reflecting surfaces 10 and 18 are in exact parallelism with each other, the measuring system will indicate othterwise if any of the components of the measuring apparatus, such as the two 90° prisms, are misaligned so that the beams are directed to produce noncoinciding images. The invention as shown in FIG. 1 utilizes 90° prisms 8 and 16, each of which is insensitive optically to motion about two perpendicular axes but sensitive to motion about a third axis parallel to the collimator beam and labeled as such in FIG. 1. What is meant by insensitive about two axes is that the prism will produce no change in direction of a beam of light traversing it as shown if the prism rotates about only one of either of two perpendicular axes each being perpendicular to the sensitive axis shown, and produces only insignificant effects on the light beam direction if rotated about both insensitive axes simultaneously. Thus, even if the two prisms do move or become misaligned about these two insensitive axes, insignificant error only, if any, will be introduced in the determination or measurement of the parallelism of the two reflecting surfaces, since the light beams used to measure the two surfaces will be essentially unaffected. Since a comparison technique between the images from the two reflecting surfaces is used to determine the parallelism or nonparallelism of the two reflecting surfaces, it can be seen that if the two 90° prisms are misaligned about their sensitive axes by exactly the same amount, no error will be introduced in the measurement of the two surfaces. The invention includes a system comparison and correction apparatus 22 which compares the alignment of the two prisms about the sensitive axes and insures that they are kept exactly in alignment with each other in this respect.

Although a specific and preferred embodiment of a 90° prism will be described hereinafter, it is intended that the invention not be limited to the particular embodiment described, but includes any equivalent apparatus. Moreover, the beam separator and beam combiner are not necessarily separate but can be combined into one optical means as will be described. Further, the invention contemplates any suitable means for maintaining alignment between the two 90° prisms about the sensitive axis, although a preferred embodiment will be described hereinafter.

Because of the insensitivity of the system of FIG. 1 to surrounding conditions, it can be seen that the physical separation of the two reflecting surface is immaterial. Moreover, the two reflecting surfaces can be displaced to any extent along axes perpendicular thereto and do not have to lie in the same plane.

The invention as shown in FIG. 1 has utility as a system for determining the parallelism or nonparallelism between two reflecting surfaces by simply noting the coincidence or noncoincidence of images in the viewer. If the system is to be used to measure the parallelism or nonparallelism, this implies knowing, in quantitative units or dimensions, the displacement of one of the reflecting surfaces relative to the other surface about only two axes, such as indicated as the yaw and roll axes in FIG. 1. Thus if the object surface is rotated about either the yaw or roll axis relative to the reference surface, the two surfaces will be out of parallelism. If, however, the object surface is rotated relative to the reference surface about the pitch axis, this will in no way affect the parallelism between the two surfaces. Here, it is to be understood that the usage of the terms roll, pitch and yaw is for convenience only and is in no way limiting on the particular axes about which displacements of two mirrors relative to each other can be measured. Rather, these terms are used because of their common usage in relation to aircraft and vessels.

If the system is to be used to make quantitative measurements of these displacements, a beambender 24 is utilized as shown in dashed lines and is inserted between one of the 90° prisms and its associated reflecting surface, such as, for example, between the reference reflecting surface and the 90° prism 8, as shown. As will become apparent, the beambender can be inserted in the path of either of light beam 1 or 2 any wheel within the system so long as it is not in the path of both beams, even though it is shown between prism 8 and surface 10 for convenience, The beambender changes the direction of one of the beams, such as beam 1, for example, and causes the beam of light to be rotated about the roll and/or yaw axes. Calibrated roll and yaw readout dials 26 and 28, respectively, are utilized for operating the beambender so that the amount the beam is deviated or bent about the roll or yaw axes can be accurately determined in quantitative units. To measure, in quantiative units, the nonparallelism of one reflecting surface relative to the other, the beambender dials are originally set at zero such that no alteration in the direction of beam 1 is effected. The operator then looks into the viewer to determine if a coincidence of image occurs. If not, the roll and/or yaw readout dials are adjusted until an exact coincidence of images occurs. The dials are then read to determine the exact amount of the nonparallelism of the two reflecting surfaces.

The invention is shown in more detail in the block diagram of FIG. 2, which illustrates schematically a preferred embodiment of the invention. It is to be understood, however, that the invention is not intended to be limited to the specific embodiment to be described, but rather, it is intended that equivalent means for producing the same functions can be substituted for the various components of the system. A collimator lamp 4 is provided for producing a well defined beam of light from which two beams are derived for reflection off the two surfaces to be measured. The lamp can be of any suitable design which preferably is an incandescent source associated with a suitable lens system for collimating the light. The beam separator is required to provide a pair of light beams derived from a single source or collimator lamp 4. What will be referred to hereinafter as a dual beam modulator is preferably used as a beam separator and beam combiner to produce the above-noted scintillating effect and comprises a pair of identical prisms 40 and 48 mounted by any suitable means on a horizontal shaft or axle 56 which does not extend through the prisms. The axis 56 extends on either side of the two prisms and is held in pivotal arrangement between stationary supports or walls 57 so that the two prisms can rotate together about the axis defined by the shaft. Another shaft 58 is rigidly attached to the shaft 56 which extends therefrom and is urged against and rides on a cam 60 by means of a resilient member 59 mounted between the shaft 58 and a stationary support 57. The cam is driven by a motor 61 through a motor shaft 62 at a relatively low speed, such as, for example, a few revolutions per second. Thus, the two prisms 40 and 48 comprising the dual beam modulator are caused to rotate together about the shaft 56 at a slow frequency. This frequency is unimportant and its constancy is relatively immaterial, since it serves only to determine the frequency at which beams 1 and 2 are created in sequence.

Side and front views of one of the prisms of the dual beam modulator are shown in FIGS. 3-A and 3-B, respectively. Advantage is taken of the fact that light striking an interface between two media having a different indices of refraction will be totally internally reflected if it strikes the interface at less than the critical angle. For a prism comprised of glass with an index of refraction of 1.5, the critical angle between a glass-air interface is about 48.5°. If the light is travelling in the glass and strikes the glass-air interface at less than 48.5°, the light will be totally internally reflected. If the light beam strikes the interface at an angle greater than 48.5°, the light will not be reflected but will pass on through the interface into the air.

The dual beam modulators are rhomboid prisms, with prism 40 being comprised of section 42 joined with section 44 along surface 46 which is cut at the critical angle $\theta$ with respect to the input beam from the collimator lamp 4 when the prism is neither rotated forward nor backward by the cam drive. The two sections 42 and 44 are cemented together along the edges of the interface 46 so that an air gap is formed therebetween. When the prism is rotated forward with the top of the prism being moved toward the collimator lamp, the angle between the interface 46 and the input beam is increased in excess of the critical angle; the input beam then strikes the interface at this greater angle and passes through the prism without reflection or deviation. When the prism is rotated backwards in the opposite direction, the angle between the input beam and the interface 46 is decreased below the critical angle; the input beam then strikes the interface at the smaller angle and is totally internally reflected. The totally reflected beam is reflected up to the roof of the prism which is cut at the same angle as the interface, where it is again totally internally reflected and passes out of the prism parallel to the input ray. It is also apparent that a beam of light can traverse the prism in the opposite direction. It has been found that oscillation of the prism by $\pm 1.5°$ is sufficient to cause unpolarized light to be resolved into the two beams as previously described. To produce a suitable scintillating effect, the prism is oscillated at about 2 cycles per second. The two light beams 1 and 2 are repetitively produced in sequence but at different times, and thus the term modulator. It can be shown that the rhomboid prisms do not affect the direction of the light beam but only displace it, whereby the output ray is always parallel to the input ray regardless of the rotation of the modulator. Only the prism 40 creates the two beams 1 and 2 from the original collimator beam, whereas the prism 48 cooperates with prism 40 in directing the beams reflected off of the reflecting surfaces into the viewer 14 at the proper times, as will be described hereinafter.

A first 90° prism 8, named so because it changes the direction of an impinging light ray by 90°, is mounted in the path of beam 1 but above the path of beam 2. This prism is comprised of two sections 64 and 65 joined together, with beam 1 entering the face of section 64. Although a detailed description of the 90° prism will be presented hereinafter, the function of the left section 64 is to direct the beam toward a first reflecting surface to be measured along a path perpendicular to the original direction of propogation of beam 1. Beam 1 is then reflected back into and through section 64 and into the other portion 65, where again the beam emerges from the prism parallel to the original beam 1 but spaced therefrom and propogating in the opposite direction, whereby it impinges on the upper back surface of the other dual beam modulator prism 48. The reverse path of traversal of a light beam through the prism 48 is the exact reverse of the forward path through prism 40 previously described when prism 48 is oriented in exactly the same manner. That is to say, if the top of prism 48 is rotated toward the viewer 14, the light beam 1 will be totally internally reflected twice within the prism 48 off of the top surface and interface 54, respectively, and emerge from the front face of the prism toward the viewer 14. The entire traversal of the ray 1 from the collimator lamp to the viewer 14 is instantaneous for all practical purposes and takes place before beam 2 is produced.

Describing now the path of traversal for beam 2 derived from the prism 40, beam 2 is created from the collimator lamp beam when the top of prism 40 is rotated toward the collimator lamp and is simply the original collimator lamp beam passing directly through the prism 40, as earlier explained. The first 90° prism 8 is situated above the line of the original collimator lamp beam and, thus, the beam 2 passes underneath said prism to impinge on the front surface of a second 90° prism 16. The 90° prism 16 is identical to 90° prism 8 and comprises two sections 68 and 69, respectively, with beam 2 striking the front surface of section 68 and being directed 90° thereto onto the object reflecting surface 18. This beam is similarly reflected back from the surface and passes through section 68 into section 69 of prism 16, where it is directed out of the front surface of section 69 parallel to but in spaced relation to the original beam 2, and propogating in the opposite direction. It will be seen that beam 2 is directed onto the lower back surface of prism 48 below beam 1 and will pass directly through prism 48 if the prism is still rotated forward along with prism 40. Like beam 1, the traversal of beam 2 through its entire path is instantaneous and occurs before beam 1 is again produced. Thus it can be seen that an image will be seen in the viewer by the observer of each of beams 1 and 2 reflected off of their respective reflecting surfaces. Since the two beams 1 and 2 are being created at a relatively slow frequency, the observer sees the scintillating effect of the two images if they are not in exact coincidence. However, if they are in exact coincidence, the images will appear as one.

Assuming that both dual beam modulations 40, 48 and both 90° prisms 8, 16 are exactly in line such that no error is introduced by the apparatus itself, and information as to the displacement of one surface relative to the other is desired, a beambender is used to give a quantitative readout of the nonparallelism of the two reflecting surfaces. As shown in FIG. 2, the beam bender comprises, in a preferred embodiment, three lenses 70, 72 and 74 aligned on an optical axis between the reference reflecting surface 10 and the 90° prism 8, with a roll readout dial 26 being mechanically connected to lens 70, and a yaw readout dial 28 being mechanically connected to lens 74. As noted above, the beambender can be situated anywhere along a single light beam path. The beambender is shown schematically in more detail in FIGS. 4–A and 4–B, whereby both lenses 70 and 74 have negative focal lengths of equal values and are otherwise identical, and a positive focal length lens 72 is situated between the two negative length lenses and is equally spaced from each. The positive focal length lens 72 is fixed and held in any suitable lens holder mounted to a stationary support, whereas lenses 70 and 74 are movable response to the two readout dials as will be described. For the preferred operation, the positive lens 72 has about twice the power of the negative lenses, whereas the three lenses combined have no power and only change the direction of the collimated beam when one or both of the negative lenses are moved out of line of the optical axis. By geometrical optics, it can be shown that a movement of one of the negative lenses in a direction perpendicular to the optical axis will cause the vitual image on the same side as the lens being moved to move an equal amount in the same direction. This also causes the virtual image on the opposite side of the beambender to move an equal distance in the opposite direction without any movement of the other lens 74. This is more clearly depicted in FIG. 4–B, where the lens 70 has been lowered by a distance $d$ by rotation of the roll readout dial and, in turn, its virtual image has been lowered by the same distance $d$. The other image on the opposite side of lens 74 is also raised by a distance $d$. In addition, the direction of the light beams emerging from lens 74 is swung upward by an angle $\varphi$ whose tangent is equal to $d/f$, where $f$ is the focal length of the negative lenses. It can be seen that a lateral movement of the negative lens 74 by rotation of the yaw readout dial will cause a corresponding lateral or sideways bending of the light beam. It can also be shown quite readily that the beambender can be constructed using positive lenses in place of negative lenses and vice-versa, with exactly the same results, with the negative lens replacing the positive lens having twice the power as other lenses.

The beambender is constructed such that the roll readout dial is connected to the negative lens 70 by a mechanical linkage and moves this lens with a precision screw, and the yaw readout dial 28 is connected to the negative lens 74 by a similar mechanical linkage. Rotation of the roll readout dial 26 in one direction causes lens 70 to move upward, whereas rotation of the dial in the opposite direction causes the lens to move downward. Similarly, rotation of the yaw readout dial 28 in one direction causes lens 74 to move laterally in one direction, and rotation of the yaw dial in the opposite direction causes the lens 74 to move laterally in the opposite direction. This means that the negative lense 70 and 74 are being moved along the yaw and roll axes, respectively, which also implies that the beam 1 is being bent upward or downward according to the amount and direction of the roll readout dial 26, and left or right according to the amount and direction of the yaw readout dial 28. As stated in conjunction with FIG. 1, if the roll and yaw readout dials are initially set at zero, which implies no bending of the beam 1 in any direction such as shown in FIG. 4–A, and a measurement is made on the two reflecting surfaces with the result that noncoincidence of images is observed, the roll and yaw readout dials are turned until a coincidence of images is observed. The operator then notes the amount and direction each readout dial was turned by reading off of a micrometer scale, and the orientation of one reflecting surface relative to the other is known. The beambender has the advantage that small movements of the unit as a whole do not affect the reading of the entire system. Furthermore, the beambender is linear and provides a direct conversion of linear lens movement to angular beam deviation, which is that expressed by the angle at which the beam is bent. Finally, the scale factor of the beambender (that is, the amount of lens movement that corresponds to a given number of seconds) is completely at the designer's discretion. In other words, a large mechanical movement can be made to correspond to a very small beam deviation and thereby provide an extremely sensitive and accurate instrument.

It has already been stated that neither of prisms 8 and 16 significantly affects the direction of beams 1 and 2, respectively, by rotation about two perpendicular axes, those being the yaw and pitch axes. This will be described in more detail hereinafter with reference to FIGS. 12–14. However, should the two 90° prisms 8 or 16 become misaligned relative to each other due to rotation about the roll axis, error would be introduced into the measurements by the system if correctional measures are not taken, since the 90° prisms are not insensitive to this particular motion and will affect the direction of the light beams 1 and 2. Thus, the system comparison and correction apparatus 22 is provided as shown in FIG. 1 to maintain the two 90° prisms 8 and 16 in line with each other about the roll axis. It is only necessary that the two prisms be aligned with each other about this axis, their absolute alignment relative to the yaw and pitch axes being immaterial.

The apparatus for maintaining alignment between the two 90° prisms is shown in its preferred embodiment in FIGS. 2 and 5 and will presently be described with reference to FIG. 5 and the following FIGS. 6–10. FIG. 5 is a schematic block diagram of the system correction and alignment apparatus showing its application in general to maintaining alignment between two components of any equipment about an axis of alignment as shown, wherein a light source 130 characterized by a constant intensity is directed on an optical cell 134 through a polarizer 132. The exact nature of the polarizer and the type of polarization created depend upon the particular design of the system as will be noted hereinafter. The light beam traverses the cell and emerges on the opposite side thereof where it is directed to impinge on an analyzer 136, which is normally another polarizer. The purpose of the cell 134 is to cause a change in the polarization characteristics of the polarized beam entering the cell when a signal is applied to the cell from a cell driver 138. However, the light beam is unaffected in its polarization characteristics when traversing the cell if no signal from the cell driver is applied, but undergoes a change in its polarization characteristics upon the application of a signal from the cell driver. The analyzer 136, which is another polarizer, is used to allow only a portion of the light striking it to pass through, depending upon the polarization of the light from the cell. The signal from the cell driver causes a phase change in the two perpendicular components of the originally polarized beam as they traverse the cell which, in turn, causes the polarization characteristic of the beam emerging from the cell to vary. It is well known that any polarized light beam can be expressed as two perpendicular vectors vibrating at a given phase angle, depending upon the type of polarization. A suitable detector 140, such as a photomultiplier tube or a photovoltaic cell, as examples, is positioned behind the analyzer, registers the intensity of the light emerging from the analyzer and converts the emerging light or beam into an electrical signal proportional of the intensity thereof.

The function of the system of FIG. 5 is the comparison of the alignment of the cell 134 and the analyzer 136 when the cell and analyzer are both respectively attached to some piece of equipment or components of a piece of equipment, such as, for example, the two 90° prisms 8 and 16 shown in FIG. 2. However, for purposes of the present discussion and the description of the camparison and correction apparatus, the pieces of equipment to which the cell and analyzer are respectively attached are referred to as components A and B. Further, it will be assumed for the purpose of this explanation only that component A and cell 134 are stationary, whereas component B and the analyzer are free to be rotated about the axis of alignment, as shown. The output of the detector 140 is connected to an electrical to mechanical feedback system 142, which in turn is connected to component B and the analyzer by means of a mechanical linkage, for example. The feedback system moves the component B and analyzer about the alignment axis in response to the detector output to maintain an alignment between the cell and the analyzer about the alignment axis. When the cell and analyzer are properly aligned, the light beam striking the analyzer has a polarization such that the detector either does not produce an output signal or the signal produced is such that the electrical to mechanical feedback system does not respond to the signal. As the cell and analyzer become misaligned about the axis of alignment (which implies that components A and B are misaligned), the intensity of the light emerging from the analyzer and striking the detector changes, which causes a signal at the output of the detector to which the electrical to mechanical feedback system responds. The latter realigns component B relative to component A in response to this signal, which in turn, causes the signal to decrease. This realignment system obviously may also be designed to align component A relative to component B. As long as the two components are aligned relative to each other, even though both may have moved from their original positions, the parallelism or nonparallelism of the two reflecting surfaces will be properly indicated to the observer by a single image in the viewer 14 if the two reflecting surfaces 10 and 18 are aligned, and by two images if the surfaces are misaligned, the separation of the two images being an indication of the extent of their misalignment. By use of the beambender, the two images may be brought together and thereby the degree of misalignment may be measured.

A preferred embodiment of the automatic comparison and correction apparatus is shown in FIG. 6, which excludes the electrical to mechanical feedback system, the latter being described hereinafter in its preferred embodiment in conjunction with FIG. 2. Unpolarized light of constant intensity is directed onto a linear polarizer 150 and then onto a quarter-wave plate 152 to produce circularly polarized light impinging on the cell 134. Circularly polarized light is preferred as will be shown later, although linear or elliptically polarized light can also be used. A substance 134 having electrodes 154 and 156 attached to opposite faces thereof is situated in the optical path of the circularly polarized light, wherein the substance 134 and the associated electrodes will be referred to hereinafter as a Pockels cell. An alternating voltage supply 162 is connected to the electrode plates by means of electrodes 158 and 160, respectively, for applying an alternating electric field between the plates, wherein the function of the Pockels cell in conjunction with the alternating voltage supply is to alter the polarization characteristics of the light that passes therethrough.

The Pockels effect is well known and relates to certain isotropic substances acquiring the optical properties of a uniaxial crystal in an electric field. That is, under the influence of an applied field, the substances become birefringent and polarized light, upon traversing a substance of this kind in the presence of a field, undergoes a change in the nature of its polarization. This change can be explained by considering the light to be composed of two mutually perpendicular linear polarized waves vibrating parallel and perpendicular, respectively, to the optic axis of the substance, the phase between the two linear vectors depending upon the exact polarization of the light, all of which is well known. That is to say, polarized light, whether it be linear, circular or elliptical, can be resolved into two mutually perpendicular linear components. When the polarized light traverses one of these optical substances in the absence of an electric field, it leaves the substance without a change in polarization. However, if a field is applied, the linear components of the polarized wave undergo a change in their phase relationship. This change in phase is a function of the magnitude and polarity of the applied field. Therefore, the state of polarization of the emergent light is a function of the field. This change of phase between the linearly polarized components during their traversal of the optical subtsance is due to the fact that the index of refraction is different for each component, which is a result of the substance itself having different indices of refraction for light traversing the substance in different directions in the presence of the field. Therefore, one linear component of the light becomes retarded with respect to the other as they travel the length of the substance. If the polarized light traverses the optical substance in the presence of an alternating field, the emergent light at any point along the path will undergo continuously changing states of polarization. As examples of substances which exhibit the Pockels effect, zinc sulfide is preferred, although cuprous chloride and hexamethylene tetramine are other examples.

FIG. 7 is a front view of the Pockels cell of FIG. 6 with the direction of propogation of the light being out of the plane of the drawings, and illustrates schematically the Pockels effect. Here, the substance 134 is preferably cut so that the optic axis thereof is perpendicular to the electric field created by the electrodes 154 and 156, and perpendicular to the direction of propogation of the light. With no electric field applied to the substance 134, the circularly polarized light, or any other type of light for that matter, would traverse the crystal without change in its nature of polarization. This is indicated by the index circle noted in FIG. 7, which indicates that the index of refraction in the substance is the same in all directions. However, when an electric field is created between electrodes 154 and 156 of one polarity, the index of refraction for linear components of light perpendicularly to the electric field and parallel to the optic axis is increased, but is decreased for linear components parallel to the field is perpendicular to the optic axis and is indicated as such by index ellipse Y. The reverse is true when an electric field is created between the electrodes 154 and 156 of the opposite polarity, and is indicated as such by index ellipse Z. When circularly polarized light traverses the substance 134 in the presence of an electric field applied between the two electrodes 154 and 156, its polarization will be changed from circular to some form of elliptical, where the polarization ellipse of the emergent light will be at 45° to the index ellipses as indicated in FIG. 8, the particular ellipse in FIG. 8 depending upon the polarity of the applied field. If the field is alternating, the polarization of the light emerging from the cell will go from one polarization ellipse (indicated as field of first polarity) to the other polarization ellipse (indicated as field of second polarity) and back again over one complete cycle of the electric field. At zero field, the polarization is a circle, as indicated. It should be noted that the ellipses in FIG. 7 represent schematically the indices of refraction of the substance 134 comprising the cell, whereas the ellipses of FIG. 8 represent schematically the poralization characteristics of the light beam, and the two should not be confused.

Referring back to FIG. 6, the presence of an electric field on the Pockels cell 134 produces a resultant emergent beam of light which represents a phase modulation between the linear components. In order to utilize this in the system of FIG. 5 to indicate when component A is misalined with component B, an analyzer 136 is placed in the path of the beam to convert the phase modulation to an intensity modulation, wherein the analyzer is simply another linear polarizer as already stated. Referring again to FIG. 8, if the axis of the analyzer is aligned with either axis N or N' which are coincident with the Z and Y axes, respectively, of the cell, the intensity of the light striking the detector 140 which passes through the analyzer will be constant and not vary as a function of the alternating electric field on the Pockels cells. This is apparent since the axes N and N' pass through the common points of both polarization ellipses and the polarization circle of FIG. 8. This is the condition when the analyzer axis is parallel, or in line with, the optic axis of the cell, and will be referred to as the null condition. Rotation of the analyzer axis with respect to the optic axes, however, gives an intensity modulated light beam striking the detector, when the maximum variation in amplitude occurs with the analyzer axis at 45° to the optic axis of the cell. Therefore, the analyzer axis is aligned and coincides with the cell optic axis for the condition when components A and B are aligned, and the detector output is a D.C. signal. When components A and B become misalined about the axis of alignment (axis X in FIG. 6), an A.C. signal is generated at the detector output, the magnitude of which is dependent on the degree of misalignment. In other words, an amplitude modulated detector signal results as components A and B are rotated relative to each other, wherein the analyzer creates the amplitude modulated signal from the phase modulated polarized light emerging from the cell. The detector signal is then fed to the electrical to mechanical feedback system 142 to realign component B relative to the component A as a function of the amplitude of the detector signal. From all of the foregoing, it can be seen that if the analyzer is rotated relative to the cell in one direction about the X axis, the alternating signal at the detector output has one phase, and if rotated in the opposite direction, the alternating signal has the opposite phase (180° from the former). Thus it becomes apparent that the amplitude of the alternating detector signal is an indication of the degree of misalignment of the analyzer and the cell, whereas the phase of the alternating detector signal is an indication of the direction of misalignment.

It should be pointed out that the Pockels effect works with any type of polarized light. It can be shown, however, that circularly polarized light is preferred, FIG. 9 showing a plot of the intensity of such light on the detector 140 as a function of the alternating voltage applied to the electrodes 154 and 156. It can be seen from FIG. 9 that by the application of an alternating voltage, the intensity on the detector varies linearly therewith. If linearly polarized light is used, it can be shown that a much larger voltage would be required to achieve a linear operating region.

It should also be pointed out that a D.C. voltage can be used on the Pockels cell rather than an alternating field. However, it can be seen that the difference in light intensity striking the detector is the important factor in determining the misalignment of the analyzer relative to the Pockels cell. If a D.C. voltage is used on the Pockels cell, a D.C. signal will have to be filtered from the null D.C. voltage, whereas with the use of an alternating field, the amplitude of the alternating signal is used. In other words, it is much easier and more convenient to filter an A.C. signal from a D.C. level than to filter a D.C. fluctuation from a D.C. level. A graphical representation of an A.C. signal is shown in FIG. 10 for illustrative purposes only and should not be taken as an actual signal derived from the detector. Thus as the two components' misalignment increases, the signal amplitude increases, and vice-versa.

Referring again to FIG. 5, the output from the detector is fed to an electrical to mechanical feedback system 142 which is connected in turn to one of the components, such as component B, as shown. Since the time varying intensity output of the detector corresponds in amplitude and phase to the degree and direction of rotation, respectively, of the analyzer with respect to the Pockels cell, this signal can be used to maintain alignment between components A and B, which is the over-all function of the system of FIG. 5. That is to say, its function is to maintain alignment between one component and another to which the cell and analyzer are attached, respectively, about a particular axis, such as the X axis. Referring again to FIG. 2, the X axis corresponds to the roll axis, the Z axis corresponds to the yaw axis and the Y axis corresponds to the pitch axis. Thus, as the cell and analyzer are rotated relative to each other about the roll axis, the electrical to mechanical feedback system 142 responds to the detector output to rotate component B relative to component A to bring component B back into line. As shown in FIG. 2, the two components correspond to the two 90° prisms 8 and 16, respectively, wherein the Pockels cell is rigidly attached to the 90° prism 8 and analyzer is attached to the 90° prism 16. Since the function of this portion of the system is to rotate or twist 90° prism 16 relative to 90° prism 8 to maintain alignment, the system of FIG. 5, in regard to its application to the apparatus of FIG. 2, will be referred to as the twist system.

A twist beam light source 80 is provided for transmitting an intense collimated beam of light on a circular polarizer 82, the latter which can be a combination of a linear polarizer and a quarter-wave plate, for example. It is important that the intensity of the beam from the twist beam light source not vary appreciably at the Pockels cell frequency or it would be sensed by the detector as a relative motion between the two 90° prisms 8 and 16. To provide a constant intensity beam, a low ripple D.C. supply 112 is used to supply power to the light source, where the filament in the light source itself also acts as a filter in conjunction with the low ripple D.C. supply. Any suitable lens system can be used in the light source to provide the collimated beam, all of which is well known in the art. The polarizer 82 is mounted in the path of the beam by any suitable means. An analyzer 90, which is a linear polarizer, is affixed to the front surface of the 90° prism 16 approximately at the middle thereof by any suitable means. As will be described hereinafter, the prism 16 is effective to transmit the twist beam directly therethrough when it strikes the analyzer. The over-all system uses ordinary light in one embodiment, and since it is important that the detector receive light only from the twist beam, the twist beam light source generates a fairly narrow band of wavelengths, such as infrared light, for example. Thus a color filter 92 is mounted in front of the detector and passes only infrared light and rejects or filters out stray light that would tend to impinge on tht detector from other components of the system, such as from 90° prism 16, for example.

The function of the twist system has already been described, wherein the two components now are the two 90° prisms 8 and 16. The analyzer, when in the null position with respect to the Pockels cell, transmits a light beam of constant intensity which is detected by the director 94, the latter being a photovoltaic cell, for example, and being biased by a suitable detector supply 95. The signal from the detector is fed to a suitable filter 96 which is capable of rejecting background noise or other irrelevant signals, but passes the A.C. signal derived from misalignment of the two 90° prisms 8 and 16. Such filters are commonly known and will not be described here. The output of the filter is fed to a preamplifier 98 and then to a synchronous demodulator 100, the latter being coupled to a constant frequency oscillator 102. The constant frequency oscillator, such as produces a signal of a few hundred cycles per second, for example, is also coupled to a cell driver 89, which is an amplifier for generating the alternating electric field across the cell 86. Thus the field on the cell and the synchronous demodulator are maintained exactly in phase. The synchronous demolulator is a discreet filter or a conventional phase sensitive detector. The polarity of the signal from the amplifier 98 corresponds to the direction of rotation of the analyzer 90 with respect to the Pockels cell 88, and the synchronous demodulator compares the phase, either leading or lagging, between the constant frequency oscillator 102 and the signal. The output from the synchronous demodulator 100 is fed then to a push-pull amplifier driver circuit 104 which responds to the amplitude and polarity of the demodulated signal. A driver 106 connected between the driver amplifier 104 and the 90° prism 16 and to be presently described, causes both the analyzer and the 90° prism 16 to be driven back to the null position. All of the electronics just described functionally are well known operations to those skilled in the art and will not be described in more detail here. However, all of these circuits or their equivalent and their operations can be found in standard text books of electronics, such as, for example, Electronic Designer Handbook by Landee, Davis and Albrecht, McGraw-Hill, New York, N.Y. (1957), or Pulsed and Digital Circuit by Millman and Taub, McGraw-Hill, New York, N.Y. (1956).

The combination of the driver 106, the 90° prism 16 and the analyzer 90 is shown in FIG. 11, which is a front view of the 90° prism 16 showing the analyzer 90 secured to the front face thereof. As will be seen hereinafter, the analyzer is secured to the front surface of the prism at approximately the interface of the two sections 68 and 69. A flexure pivot generally designated at 180° is provided and includes a horizontal support member 182 with mounts 183 and 184 integral therewith, and a generally C-shaped member 186 extending over the prism with a mount 187 at the end thereof, such that the prism is mounted securely between the mounts 183, 184 and 187. For accuracy, the mounts are optically polished, as is the prism, so that accurate alignment can be achieved. The flexure pivot also includes second and third horizontal members 188 and 190, whereby member 188 is joined with member 182 by side members 193 and 195, and members 188 and 190 are connected by further side members 194 and 196. Each of the aforementioned side members defines a narrowed flexible portion such as designated at 197, such that each of the horizontal members may be flexed relative to the others through the narrowed portions. All of the members are thick enough in a direction perpendicular to the plane of the drawing so that flexure about the yaw and pitch axes is precluded. The member 190 is securely mounted to a stationary support 192. Positioned about the member 188 but spaced therefrom is a permanent magnet 200 which is also attached to a stationary support, such as 192, and rigidly attached to the member 188 is a coil 202, the latter being connected electrically and in proper polarity to the driver circuit 104. A signal of one polarity and a given magnitude causes the member 188 to be moved through the permanent magnet to the right or the left, depending upon the polarity of a signal, as a result of the interaction between the coil and magnet. If the member 188 moves to the right, for example, the arms 195 and 196 become more vertical, whereas the arms 193 and 194 become more horizontal, which causes a rotation of the 90° prism 16 in a counterclockwise direction. A signal of the opposite polarity causes a rotation of a prism in a clockwise direction. It can thus be seen how rotation about the roll axis is achieved, wherein the flexure pivot acts as the driver for rotation.

A description of the 90° prism operation will be given in conjunction with FIG. 14. However, in order to explain the operation of the prism, it is believed that a discussion relating to conventional 90° prisms will be helpful, such as shown in FIGS. 12 and 13, wherein it has been noted earlier that the particular 90° prisms used in the system of FIG. 2 are essentially insensitive to rotation about two perpendicular axes. These axes are the yaw and pitch axes, as indicated in FIG. 2, wherein rotational movements about these axes of the prism do not significantly affect the angle of the output rays. Further, it can be shown that rotation about any axis which lies in the plane defined by the yaw and pitch axes will not affect the angle of the output beam, whereas rotation about axes which do not lie in this plane will affect the output beam angle.

The 90° prisms used in the system of FIG. 2 consist of a plane pentaprism combined with a roof pentaprism. A plane pentaprism is shown in FIG. 12 and generally designated by 69, wherein the two surfaces 216 and 218 are perpendicular to each other, and the surfaces 212 and 214 makes an angle of 45° to each other. The remaining angles of the prism are relatively unimportant. The principal plane 210 of the plane pentaprism is defined as a plane perpendicular to both the reflecting surfaces, such as is indicated by the shaded surface, and a principal ray, indicated by the dashed line, is a light ray or beam which lies in the principal plane of the prism. If a beam of light enters one of the faces, such as 216, it will emerge from face 218 at 90° to the entering ray. The angle of the output ray is unaffected by rotation of the prism about an axis perpendicular to its principal plane. A solid line shows a ray which has an angle of $-\alpha$ with respect to the principal plane, wherein the sign convention of the angle of the general input ray is taken as negative when going down and positive when going up relative to the principal plane. This ray passes through the prism in a manner identical to that of the principal ray, although not in the principal plane, where the same angle, including the sign convention, is maintained with respect to the principal ray. Both of the rays are reflected first off the surface 212 and secondly off of the surface 214. where the rays emerge from the face 218. Although a conventional pentaprism does not utilize the critical angle effect because the rays strike the reflecting surfaces at an angle greater than the critical angle, the surfaces are suitably silvered to produce the reflections. It can be shown that neither the general input ray nor the principal ray is affected by the rotation of the prism about an axis perpendicular to its principal plane.

There is illustrated in FIG. 13 the surfaces of a roof pentaprism 68, which is similar to the plane prism, with the exception that a roof is formed by surfaces 222 and 223 in place of the reflecting surface 212 of the plane prism. The function of the roof prism is the same for the plane prism with the exception that a general input ray entering with a negative angle with respect to the principal plane will emerge with the same angle but in a positive direction. In other words, if the ray is entering downward, it will emerge upward at an equal angle. This is illustrated by the general ray shown in the drawing wherein it is reflected internally off of the roof section 222 and down onto the roof section 223. It is again reflected from this section upward onto the reflecting surface 224 and again out of the face 228. It can be seen that the ray entering with a negative angle will emerge with a positive angle of the same magnitude. Again, the faces 226 and 228, which are the entering and leaving faces of the prism, are 90° to each other to produce a 90° direction change, whereas the intersection line between the roof sections 222 and 223 makes an angle of 45° with the reflecting side 224. Moreover, the roof sections 222 and 223 make an angle of 90° with each other. Also, the sides 214 and 218 of the plane prism make an angle of 22.5° with each other, as do sides 224 and 228 of the roof prism, all which is well known. Again, none of the rays or beams of light are affected by rotation of the prism about an axis perpendicular to its principal plane. Of course, the rays can enter and leave the prisms in the opposite directions and follow the same paths.

FIG. 14 shows a combination of the plane and roof pentaprisms to form the 90° prisms used in the system of FIG. 2. Essentially, the 90° prism is formed by the joining of the two separate prisms along faces 218 and 224, respectively, although an additional wedge of glass having an angle of 22.5 is made into one of the prisms for fitting between the two faces 218 and 224 so that the two sides 216 and 226 will be parallel to form a flat front surface, which, in turn, will be perpendicular to side 228. It can be seen that it is important that the front surface of the entire prism be at an angle of 90° to the side 228, so that a 90° alternation in the light beam directions will be achieved. Moreover, when the 90° prism is formed, the interface 230 between the two sections forms an angle other than 90° to the front surfaces 216 and 226. Essentially, the side 228 of prism section 68 becomes the leaving face for prism section 69, which is perpendicular to its entering face 216. Since the yaw axis is still perpendicular to the principal planes of both sections, rotation of the 90° prism assembly about the yaw axis cannot affect the angle of the output ray. Now, it needs to be considered whether rotation of the prism assembly about the pitch axis will affect the angle of the output ray.

It will first be noted how the ray progresses through the prism assembly, wherein again the principal rays are those lying in the principal planes. A general input ray is shown entering the front face 226 of the roof prism section 68; wherein it is reflected off of the roof sections as previously described. Further, the ray is reflected again off the interface 230, which is a dichroic reflector that transmits half of the light and reflects the other half as will be explained hereinafter, and is projected onto the mirror 18 of FIG. 2. Here, it is reflected back into the prism assembly through the face 228 and proceeds through the interface 230 (actually only a portion since it is half-silvered), where it is reflected off of the surface 214 of the plane prism section 69. It is again reflected off of the face 212 where it is projected out of the prism assembly as an output ray. Tracing the ray, it will be seen that if the input ray is initially at an angle of −α to the principal plane, the ultimate output ray will be at an angle of a +α, since the roof prism section changes the sign of the angle.

Since the pitch axis is perpendicular to the reflecting surface 18 being read, rotation of the prism assembly about the pitch axis is equivalent to rotation of the input ray about the pitch axis. That is, saying that the output ray is unaffected by prism rotations about the pitch axis is equivalent to saying that the output ray will remain parallel to the input ray while the input ray is rotated about the pitch axis. The system will be analyzed from the latter standpoint. From traversing the ray through the prism system where it has been shown that an input ray entering at an angle of −α produces an output ray leaving at an angle of a +α, which is parallel to the input ray but being propagated in the opposite direction, it becomes apparent that regardless of the angle of the input ray relative to the principal plane, the output ray will be parallel thereto and progressing in an opposite direction. This is equivalent to saying that rotation of the prism assembly about the pitch axis in no way affects the output rays. Thus it is seen that the prism assembly is insensitive to rotation about both the pitch and yaw axes.

The effect of any movement of the mirror or reflecting surface being measured will now be considered, where rotation of the reflecting surface about the roll axis will simply affect the angle that the ray makes with respect to the principal plane after reflection. Since this angle is unaffected by passage through the plane pentaprism, the output ray will simply be rotated about the pitch axis by an amount equal to twice the angle that the reflecting surface was rotated about the roll axis. Rotation of the reflecting surface about the yaw axis causes the reflected ray from the reflecting surface to be rotated about the yaw axis, but by an amount equal to twice the angle through which the reflecting surface was moved. Therefore, the output ray will also rotate about the yaw axis by an amount corresponding to twice the angle that the reflecting surface will rotate about the yaw axis.

The prism assembly or 90° prism 16, which is that shown in FIG. 14, is designed such that the interface 230 joining the two prism sections 68 and 69 will transmit the twist beam, since the prism is directly in the path of the twist beam and the analyzer is attached to the front surface thereof. It should be noted, however, that the analyzer could be mounted beneath the prism in rigid relation thereto such that the twist beam would not have to pass through the prism, as shown in FIG. 5. The twist beam strikes the front surface of the prism assembly at approximately 90°, upon which it enters the plane prism section 69. The interface 230 is a dichroic reflector which is a non-metallic coating designed to reflect 50% of ordinary light and transmit the other 50%, but transmits infrared light without reflection. Such dichroic reflectors are well known in the optical arts. A flat section 232 is provided to the prism assembly and is parallel to the front surface so that the twist beam is not refracted as it leaves the prism. The requirements on the glass from which the prisms are made are those specifications in the optical arts required for similar optical purposes, such as a minimum of birefringence. A preferred value for the maximum birefringence would be about 5 millimicrons/centimeter, these units being a common notation.

The invention has been described in the foregoing paragraphs with reference to a particular embodiment. However, it will become readily apparent to those skilled in the art that various modifications and substitutions can be made without departing from the true scope of the invention. Without limiting the invention but for illustrative purposes only, some additional remarks will serve to illustrate some of these modifications and how the invention may be varied insofar as its particular subsystems. For example, other optical means can be substituted for the two 90° prisms 8 and 16 as shown in FIG. 2. As one example of an alternate optical means, a system of reflecting surfaces can be provided to serve the same function as the 90° prism. These surfaces will be silvered where total reflections are desired and half-silvered where both reflection and transmission are desired, such as the case for surface 230 in FIG. 14. Moreover, other prisms or systems of reflecting surfaces can be provided that direct light beams 1 and 2, as shown in FIG. 2, along paths other than 90° to these beams while retaining the insensitive characteristic about the yaw and pitch axes as previously described. It is only necessary that the optical means used direct the two beams 1 and 2, respectively, along parallel paths toward the reflecting surfaces. By similar reasoning, the optical means used can redirect the reflected rays along different paths than that shown in FIG. 2 so long as the two paths along which beams 1 and 2 are redirected after reflection from the reflecting surfaces maintain the same angle therebetween as do the beams reflected off the reflecting surfaces.

The use of dual beam modulators or prisms 40 and 48 as shown in FIG. 2 can be obviated by designing an optical means to replace the prism 8, for example, which will receive the original beam from the collimator lamp 4 and transmit half of it and reflect the other half. This could be accomplished by providing a half-silvered surface on the roof sections of section 64 of the 90° prism 8. Thus the prism 8 would not only serve as a means for redirecting one of the beams toward a reflecting surface, but would also act as a beam separator and provide two beams. In such a case, the prism 16 or other optical means would be aligned directly behind the prism 8 to receive the transmitted beam. Morover, the prisms 8 and 16 or equivalent optical means could redirect the beams from the reflecting surface along the same path as the original beam directly back into a viewer contained within the collimator lamp housing. Such is the case of the commonly known autocollimators.

A specific description of a twist system which uses the Pockels effect has been described as a preferred means for comparing the alignment bewteen the prisms 18 and 16 and for correcting any misalignment therebtween. As stated earlier, any means can be used to provide the correction for misalignment. Moreover, the specific system described can be varied. For example, a pulsed light beam can be used from the twist beam light source so long as reasonable care is excersised to insure that intensity variations thereof do not occur at the same frequency at which the Pockels cell is driven, since such variations would be indicated by the detector as a misalignment. However, pulsed infrared light, for example, would enhance the signal to noise ratio of the system whereby a pulsed light source can be operated, for example, at a higher frequency than the cell alternating voltage. The detector would detect these pulses after passing through the system and suitable circuitry would be provided for utilizing the envelope of these pulses. Moreover, other modifications can be made in the system comparison and correction apparatus such as by the use of the well-known Kerr or Faraday effects on an optical cell rather than the Pockels effect.

Various indicators, controls and adjustments can also be provided which are commonly empolyed in the optical arts for measuring equipment. Also, mounting means for the various components are well known with many variations possible, including housings for the system. For example, the first 90° prism assembly, beambender, beam separator and combiner, collimator lamps, light sources, viewer, optical cell and related apparatus can be mounted within a single housing and used as a transmitter, with the second 90° prism assembly, analyzer, detector, and related equipment mounted in a second housing and used as a receiver, with necessary electrical connections being made between the transmitter and receiver, so that the two can be separated by any distance to accommodate reflecting surfaces at various locations. Such a transmitter and receiver could be mounted along a track such as a monorail, for example, to be moved up and down in front of the mirrors. Various other modifications and substitutions, including different applications of the present invention, will undoubtedly occur, and it is intended that the invention be limited only as defined in the appended claims.

What is claimed is:

1. Apparatus for determining the paralllelism or non-parallelism of first and second reflecting surfaces, comprising:
    (a) a light source for directing a first collimated light beam along a first path,
    (b) first optical means located along said first path for generating a pair of parallel light beams derived from said first light beam and directed along a pair of spaced paths,
    (c) second and third optical means each respectively located in one path of said pair of spaced paths, each having the property of withstanding small rotational movements about any axis perpendicular to a first axis, which is parallel to said spaced paths, and both operative to direct by reflection said pair of light beams along another pair of spaced paths which are parallel when said second and said third optical means are aligned relative to each other about said first axis,
    (d) comparison and control means for maintaining said second and said third optical means in alignment relative to each other about said first axis such that when said first and said second reflecting surfaces are each respectively located in one path of said another pair of spaced paths, said pair of light beams are reflected by said reflecting surfaces back toward said second and third optical means which redirect said light beams with the same angle therebetween as the angle between said pair of reflected light beams, and
    (e) a light beam combiner for combining said redirected light beams and for redirecting them along a single path when said redirected light beams are parallel and along closely spaced paths making the same angle therebetween as said pair of redirected beams when said redirected beams are not parallel, and
    (f) optical comparison means for comparing said combined beams for coincidence of images.

2. Apparatus according to claim 1 wherein said another pair of parallel spaced paths is perpendicular to said first path, and said pair of redirected light beams are perpendicular to said pair of reflected beams, respectively.

3. Apparatus according to claim 2 wherein each of said second and said third optical means comprises optical prism means.

4. Apparatus according to claim 1 including refracting means located along any optical path of said apparatus excluding said first path and said redirected paths for altering the direction of the light beam traveling along said any optical path sufficiently to make said pair of redirected light beams parallel to each other.

5. Apparatus according to claim 4 wherein said refracting means is calibrated to determine the degree of non-parallelism of said first and said second reflecting surfaces.

6. Apparatus according to claim 3 wherein each of said optical prism means comprises the combination of a plain pentaprism and a roof pentaprism.

7. Apparatus according to claim 3 wherein said first pair of light beams enter the front surfaces, respectively, of said prism means comprising said second and said third optical means, are directed toward said first and said second reflecting surfaces, respectively, through side surfaces of said prism means perpendicular to said front surfaces and are redirected as reflected beams from said reflecting surfaces back through the side surfaces and out through said front surfaces.

8. Apparatus for determining the parallelism and non-parallelism of first and second reflecting surfaces, comprising:
    (a) a first light source for directing a first collimated light beam along a first path,
    (b) first optical means located along said first path for generating a pair of parallel light beams derived from said first light beam and directed along a pair of spaced paths,
    (c) second and third optical means each respectively located in one path of said pair of spaced paths, each having the property of withstanding small rotational movements about any axis perpendicular to a first axis, which is parallel to said spaced paths, and both operative to direct by reflection said pair of light beams along another pair of spaced paths which are parallel when said second and said third optical means are aligned relative to each other about said first axis, (d) comparison and control means for maintaining said second and said third optical means in alignment relative to each other about a first axis such that when said first and said second reflecting surfaces are each respectively located in one path said another pair of spaced paths, said pair of light beams are reflected by said reflecting surfaces back toward said second and third optical means which redirect said light beams with the same angle therebetween as the angle between said pair of reflected light beams, (e) a light beam combiner for combining said redirected light beams and for directing them along closely spaced paths making the same angle therebetween as said pair of redirected beams when said redirected beams are not parallel, (f) optical comparison means for comparing said combined beams for coincidence of images, and (g) said means for maintaining said second and said third optical means in alignment relative to each other about said first axis including a polarized light optical system, which comprises in optical alignment:
  (i) a second light source
  (ii) a polarizer
  (iii) a polarization modulator
  (iv) a polarization analyzer
  (v) detector means for producing an output signal responsive to the intensity of light transmitted from said second light source by said polarization analyzer, and
  (vi) means responsive to said output signal to rotate said third optical means and said polarization analyzer about said first axis to align said third optical means to said second optical means.

9. Apparatus for determining the parallelism and non-parallelism of first and second reflecting surfaces, comprising:

(a) a first light source for directing a first collimated light beam along a first path, (b) first optical means located along said first path for generating a pair of parallel light beams derived from said first light beam and directed along a pair of spaced paths, (c) second and third optical means each respectively located in one path of said pair of spaced paths, each having the property of withstanding small rotational movements about any axis perpendicular to a first axis, which is parallel to said spaced paths, and both operative to direct by reflection said pair of light beams along another pair of spaced paths which are parallel when said second and said third optical means are aligned relative to each other about said first axis, (d) comparison and control means for maintaining said second and said third optical means in alignment relative to each other about said first axis such that when said first and said second reflecting surfaces are each respectively located in one path of said another pair of spaced paths said pair of light beams are reflected by said reflecting surfaces back toward said second and third optical means which redirect said light beams with the same angle therebetween as the angle between said pair of reflected light beams, (e) a light beam combiner for combining said redirected light beams and for directing them along closely spaced paths making the same angle therebetween as said pair of redirected beams when said redirected beams are not parallel, (f) optical comparison means for comparing said combined beams for coincidence of images, and (g) said means for maintaining said second and said third optical means in alignment relative to each other about said first axis, comprising:
  (i) an optical cell rigidly attached to said second optical means and being responsive to an electric field applied thereacross to change the polarization characteristics of polarized light passing therethrough,
  (ii) means for applying an electric field across said cell,
  (iii) a polarization analyzer rigidly attached to said third optical means,
  (iv) a second light source for producing a polarized beam of light directed to pass through said cell and impinge on said analyzer,
  (v) said analyzer transmitting linearly polarized light the intensity of which varies as a function of the angle between the analyzer axis and the optic axis of said cell,
  (vi) detector means located to respond to said transmitted linearly polarized light and produce an output signal response to the intensity thereof, and
  (vii) means responsive to said output signal to rotate said third optical means and said polarization analyzer about said first axis to align said third optical means to said second optical means.

10. Apparatus according to claim 9 wherein said electric field applied to said optical cell is an alternating electric field applied perpendicular to the optic axis of said cell, said polarized beam of light passes through said cell perpendicular to both said optic axis and said alternating electric field, said analyzer transmits linearly polarized light whose intensity alternates when said analyzers axis and said cell optic axis are misaligned, and the intensity and phase angle of said alternating linear polarized light vary as functions of the degree of misalignment of said cell optic axis and said analyzer axis and the direction of misalignment, respectively.

11. Apparatus according to claim 10 wherein said second light source produces circularly polarized light.

12. Apparatus for determining the parallelism or non-parallelism of first and second reflecting surfaces, comprising:

(a) a light source for directing a first collimated light beam along a first path, (b) first optical means located along said first path for generating a pair of parallel light beams derived from said first light beam and directed along a pair of spaced paths.

(c) second and third optical means each respectively located in one path of said pair of spaced paths, each having the property of withstanding small rotational movements about any axis perpendicular to a first axis, which is parallel to said spaced paths, and both operative to direct by reflection said pair of light beams along another pair of spaced paths which are parallel when said second and said third optical means are aligned relative to each other about said first axis, (d) comparison and control means for maintaining said second and said third optical means in alignment relative to each other about said first axis such that when said first and said second reflecting surfaces are each respectively located in one path of said another pair of spaced paths said pair of light beams are reflected by said reflecting surfaces back toward said second and third optical means which redirect said light beams with the same angle therebetween as the angle between said pair of reflected light beams.

(e) a light beam combiner for combining said redirected light beams and for directing them along a single path when said redirected light beams are parallel and along closely spaced paths making the same angle therebetween as said pair of redirected beams when said redirected beams are not parallel, and (f) optical comparison means for comparing said combined beams for coincidence of images.

13. Apparatus according to claim 12 wherein said first optical means comprises a first prism means mounted for oscillation about an axis perpendicular to said first path and generates one of said pair of light beams when oscillated in a first direction and generates the other of said pair of light beams when oscillated in an opposite direction, and means for continuously oscillating said first optical means to create a repeating sequence of said one and said other of said pair of light beams.

14. Apparatus according to claim 13 wherein said light beam combiner comprises a second prism means mounted for oscillation with said first optical means and directs said pair of redirected light beams into said optical comparison means according to sequence of generation of said one and said other of said pair of light beams.

15. Apparatus according to claim 12 for maintaining said second and said third optical means in alignment relative to each other about said first axis by use of a driver means comprising a flexure pivot to align the third optical means to the second optical means.

References Cited
UNITED STATES PATENTS

| | | | |
|---|---|---|---|
| 2,344,296 | 3/1944 | Frink | 88—1(MI)UX |
| 2,432,432 | 12/1947 | MacNeille | 88—1(MI)X |
| 3,326,076 | 6/1967 | Burg | 88—14(A) |

OTHER REFERENCES

R. J. King et al.: Sensitive Method for the Measurement of Small Rotations, Journal of Sci. Inst., vol. 36, December 1959, pp. 507–509.

RONALD L. WILBERT, Primary Examiner

J. ROTHENBERG, Assistant Examiner

U.S. Cl. X.R.
356—117, 138, 152, 153; 250—225